(12) United States Patent
Dixit et al.

(10) Patent No.: US 11,474,963 B2
(45) Date of Patent: *Oct. 18, 2022

(54) MODULAR ARCHITECTURE FOR CONTROL AND MONITORING OF EDGE DEVICES IN A BUILDING MANAGEMENT SYSTEM

(71) Applicant: Johnson Controls Tyco IP Holdings LLP, Milwaukee, WI (US)

(72) Inventors: Sudhanshu Dixit, Milwaukee, WI (US); Hunter R. Hobgood, Franklin, WI (US); Dinesh Trikha, Shorewood, WI (US); Ezra M. Imes, West Allis, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,341

(22) Filed: Feb. 26, 2021

(65) Prior Publication Data

US 2021/0182228 A1 Jun. 17, 2021

Related U.S. Application Data

(63) Continuation of application No. 16/456,071, filed on Jun. 28, 2019, now Pat. No. 10,956,348.

(51) Int. Cl.
| | |
|---|---|
| *G06F 13/38* | (2006.01) |
| *G06F 9/50* | (2006.01) |
| *G06F 21/73* | (2013.01) |
| *G06F 9/54* | (2006.01) |

(52) U.S. Cl.
CPC .......... *G06F 13/382* (2013.01); *G06F 9/5011* (2013.01); *G06F 21/73* (2013.01); *G06F 2213/0042* (2013.01)

(58) Field of Classification Search
CPC ....... G05B 15/02; G02F 1/163; G06F 15/173; G06F 17/00
See application file for complete search history.

(56) References Cited

U.S. PATENT DOCUMENTS

| | | | |
|---|---|---|---|
| 9,901,511 | B2 | 2/2018 | Kang et al. |
| 2004/0059814 | A1 | 3/2004 | Komiya et al. |
| 2006/0207730 | A1 | 9/2006 | Berman et al. |
| 2009/0083517 | A1 | 3/2009 | Riddle |
| 2015/0063473 | A1 | 3/2015 | Nishibayashi et al. |

(Continued)

*Primary Examiner* — Getente A Yimer
(74) *Attorney, Agent, or Firm* — Foley & Lardner LLP

(57) ABSTRACT

A device for use in a building management system (BMS) includes a base hardware component that provides communication between the equipment and a first network associated with the BMS. The base hardware component includes a processor and a memory. The device further includes a modular hardware component connected to the base hardware component and a modular software component stored in the memory that recognizes the modular hardware component connected to the base hardware component and provides communication between the equipment and a second network using the modular hardware component. The processor executes a control application to control operation of the equipment based in part on data received from the equipment and data received from at least one of the first network and the second network.

20 Claims, 10 Drawing Sheets

(56) References Cited

U.S. PATENT DOCUMENTS

| | | | |
|---|---|---|---|
| 2017/0131610 A1 | 5/2017 | Brown et al. | |
| 2018/0101157 A1* | 4/2018 | Amundson | H04L 12/2827 |
| 2019/0361412 A1* | 11/2019 | Park | H04L 12/2809 |
| 2020/0228621 A1* | 7/2020 | Gamroth | H04W 4/33 |
| 2020/0409883 A1* | 12/2020 | Dixit | G06F 9/5011 |
| 2022/0090805 A1* | 3/2022 | Vitullo | G05B 15/02 |

* cited by examiner

US 11,474,963 B2

MODULAR ARCHITECTURE FOR CONTROL AND MONITORING OF EDGE DEVICES IN A BUILDING MANAGEMENT SYSTEM

CROSS-REFERENCE TO RELATED PATENT APPLICATIONS

This application is a Continuation of U.S. application Ser. No. 16/456,071, filed Jun. 28, 2019, incorporated herein by reference in its entirety.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

Some equipment that operates as part of a BMS may not have the necessary hardware and/or software to communicate with a BMS network or other types of networks. Further, this equipment may not have the necessary hardware and/or software to aggregate sensor data, execute control logic, and receive configuration inputs. As a result, customers may be required to purchase expensive hardware and/or software to provide this functionality. For example, in order to provide advanced monitoring and control functionality to edge devices such as sensors and actuators, expensive devices such as equipment controllers and network engines may be required. It would generally be desirable to provide a more flexible, lower-cost option.

SUMMARY

One implementation of the present disclosure is a device for monitoring and controlling equipment in a BMS. The device includes a base hardware component that provides communication between the equipment and a first network associated with the BMS. The base hardware component includes a processor and a memory. The device further includes a modular hardware component connected to the base hardware component and a modular software component stored in the memory that recognizes the modular hardware component connected to the base hardware component and provides communication between the equipment and a second network using the modular hardware component. The processor executes a control application to control operation of the equipment based in part on data received from the equipment and data received from at least one of the first network and the second network.

Another implementation of the present disclosure is a BMS. The BMS includes equipment that affects an environment within a building and a device for monitoring and controlling the equipment. The device includes a base hardware component that provides communication between the equipment and a first network associated with the BMS. The base hardware component includes a processor and a memory. The device further includes a modular hardware component connected to the base hardware component and a modular software component stored in the memory that recognizes the modular hardware component connected to the base hardware component and provides communication between the equipment and a second network using the modular hardware component. The processor executes a control application to control operation of the equipment and the environment within the building based in part on data received from the equipment and data received from at least one of the first network and the second network.

Yet another implementation of the present disclosure is a method for controlling a device in a BMS. The method includes providing a base hardware component that facilitates communication between the device and a network associated with the BMS. The base hardware component includes a processor and a memory. The method further includes connecting a modular hardware component to the base hardware component and providing a modular software component stored in the memory that recognizes the modular hardware component connected to the base hardware component and provides communication between the device and a second network using the modular hardware component. The method further includes downloading a control application to the memory and executing the control application to control operation of the device based in part on data received from the device and data received from at least one of the first network and the second network.

DETAILED DESCRIPTION

Overview

Referring generally to the FIGURES, a modular smart hardware and software system architecture and associated control device is shown, according to various embodiments. This modular architecture allows for more advanced control and monitoring of edge devices such as sensors and actuators in a BMS without requiring overly expensive hardware and/or software. The control device includes a base hardware component with a processor, a memory, and one or more fixed hardware components (e.g., serial ports and a BACnet interface). One or more modular hardware components (e.g., Wi-Fi module, Ethernet module, Bluetooth module, expandable memory) may also be provided with the control device to provide more advanced functionality depending on the specific control application. Application developers can build control applications and download the control application directly to the control device to control operation of building equipment.

Building Management System and HVAC System

Figure 1:
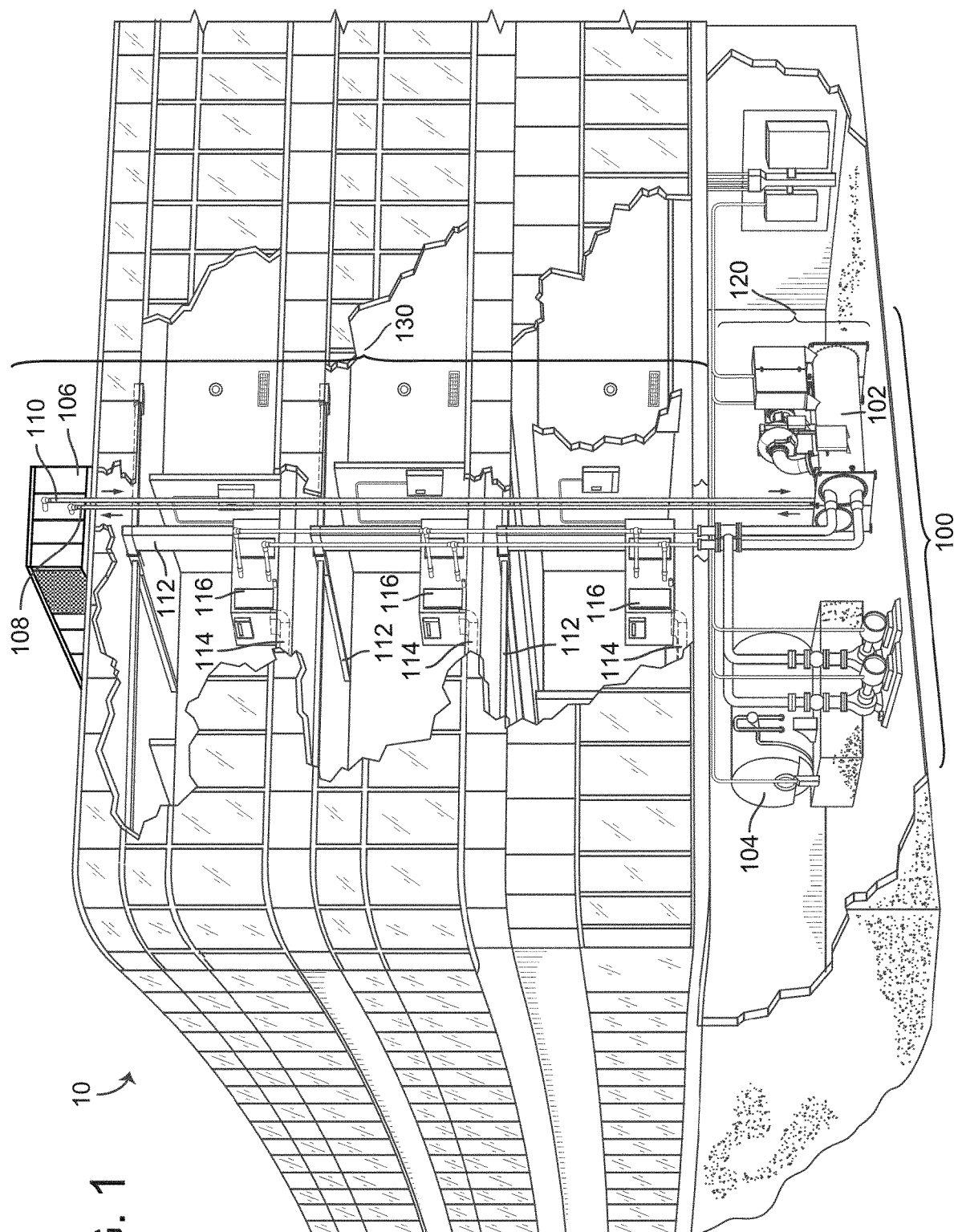
FIG. 1 is a drawing of a building equipped with a building management system (BMS) and a HVAC system, according to some embodiments.

Referring now to FIGS. 1-4, an example building management system (BMS) and HVAC system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
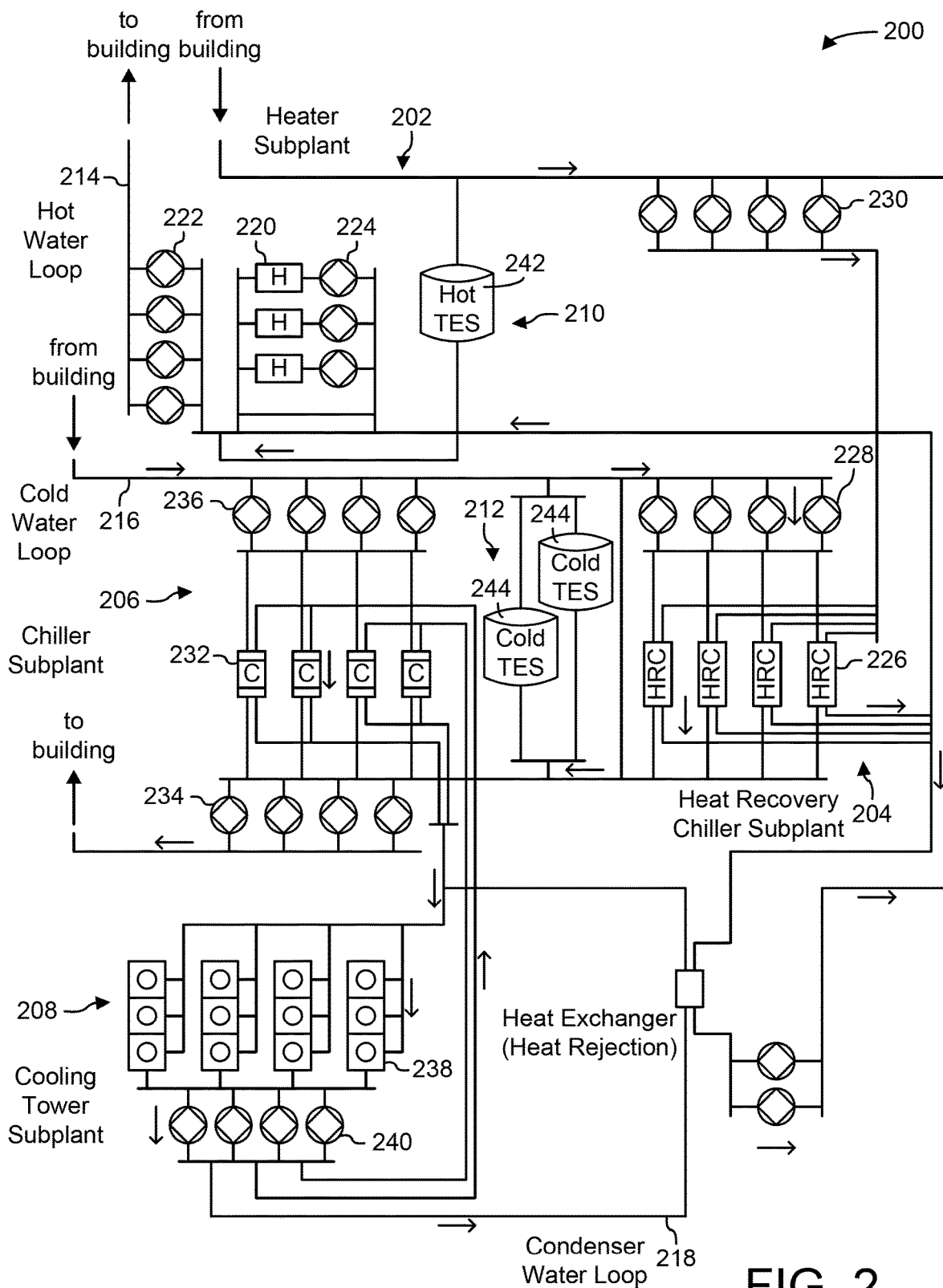
FIG. 2 is a schematic of a waterside system which can be used as part of the HVAC system of FIG. 1, according to some embodiments.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
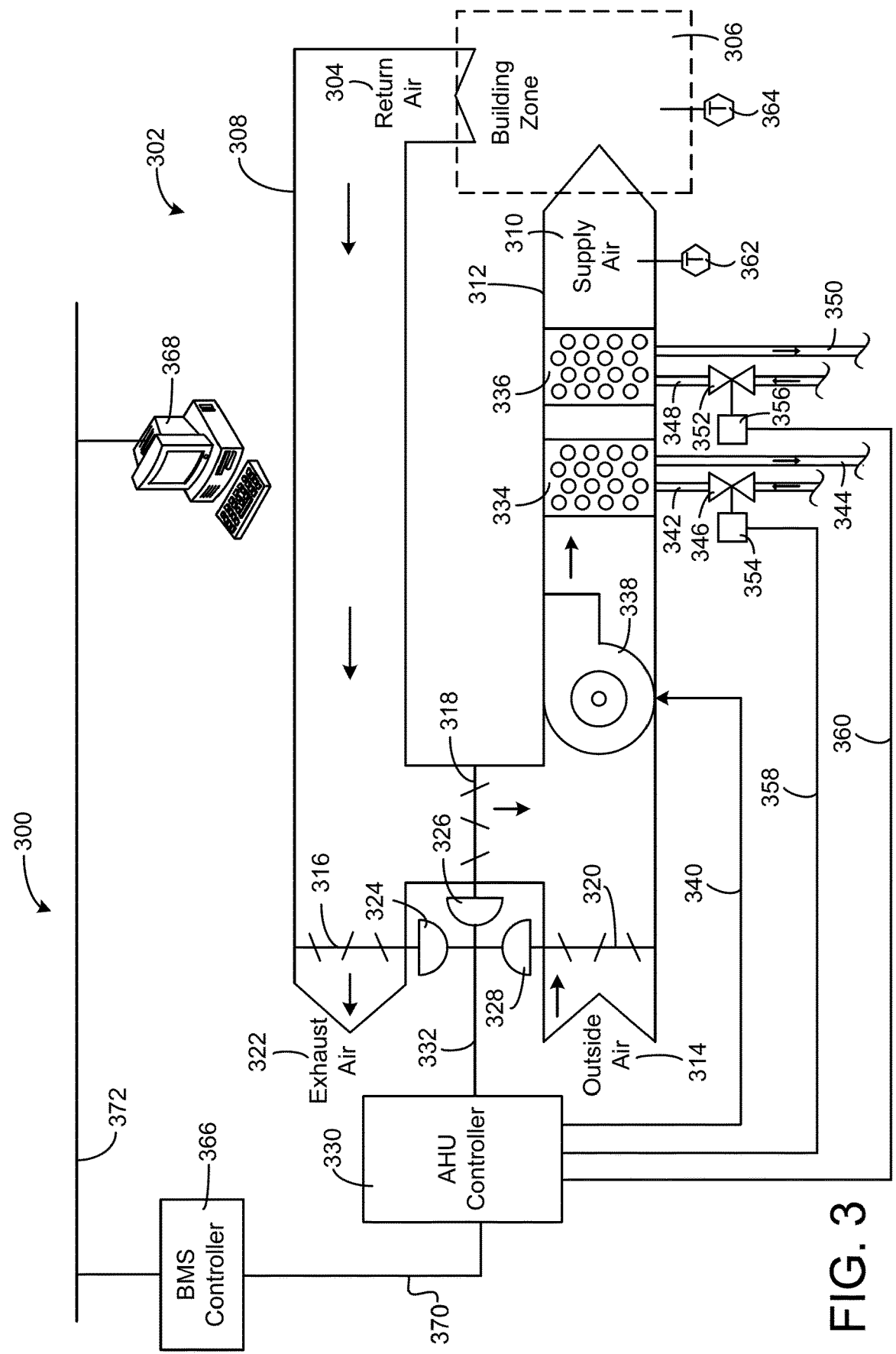
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
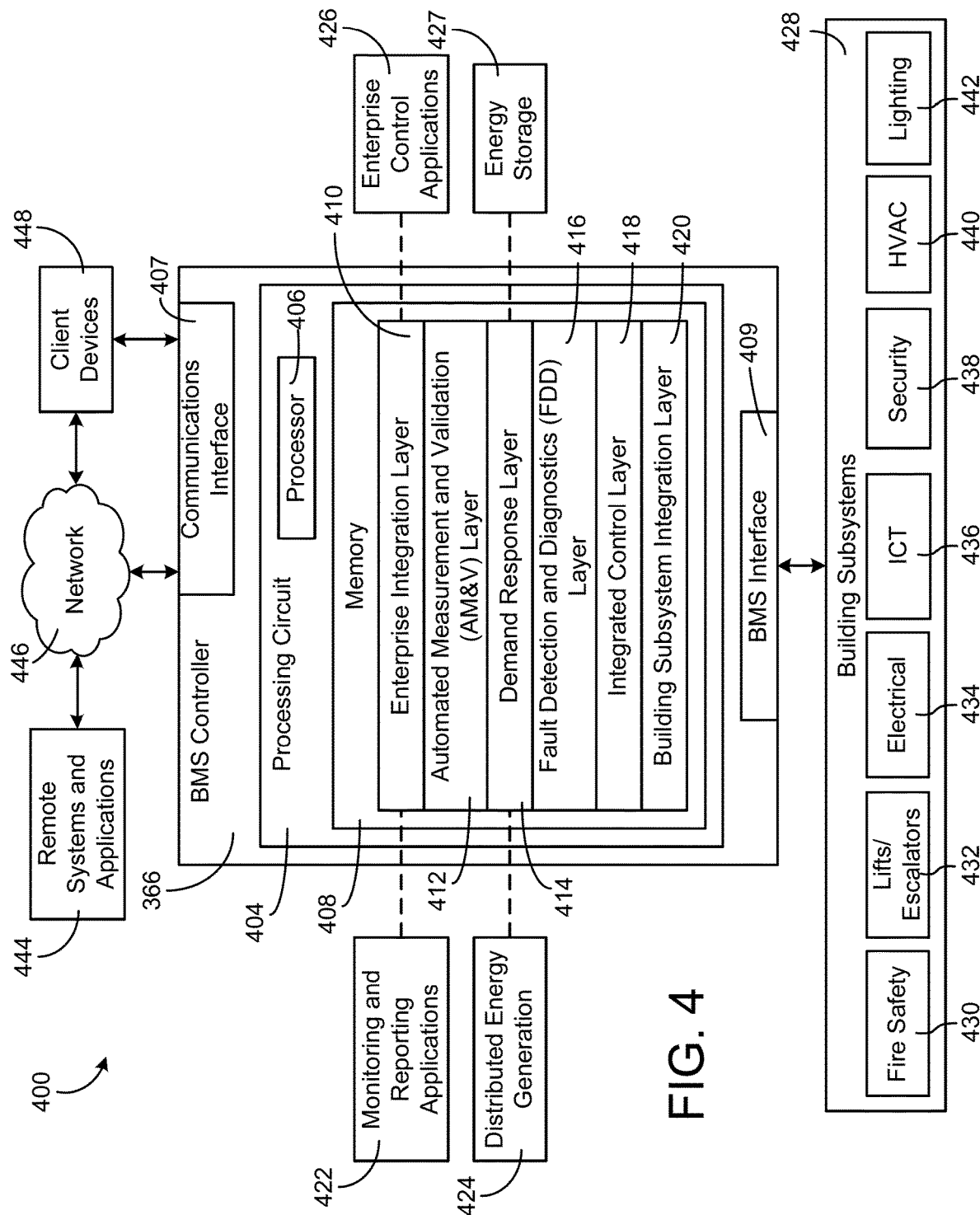
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Modular Architecture

Figure 5:
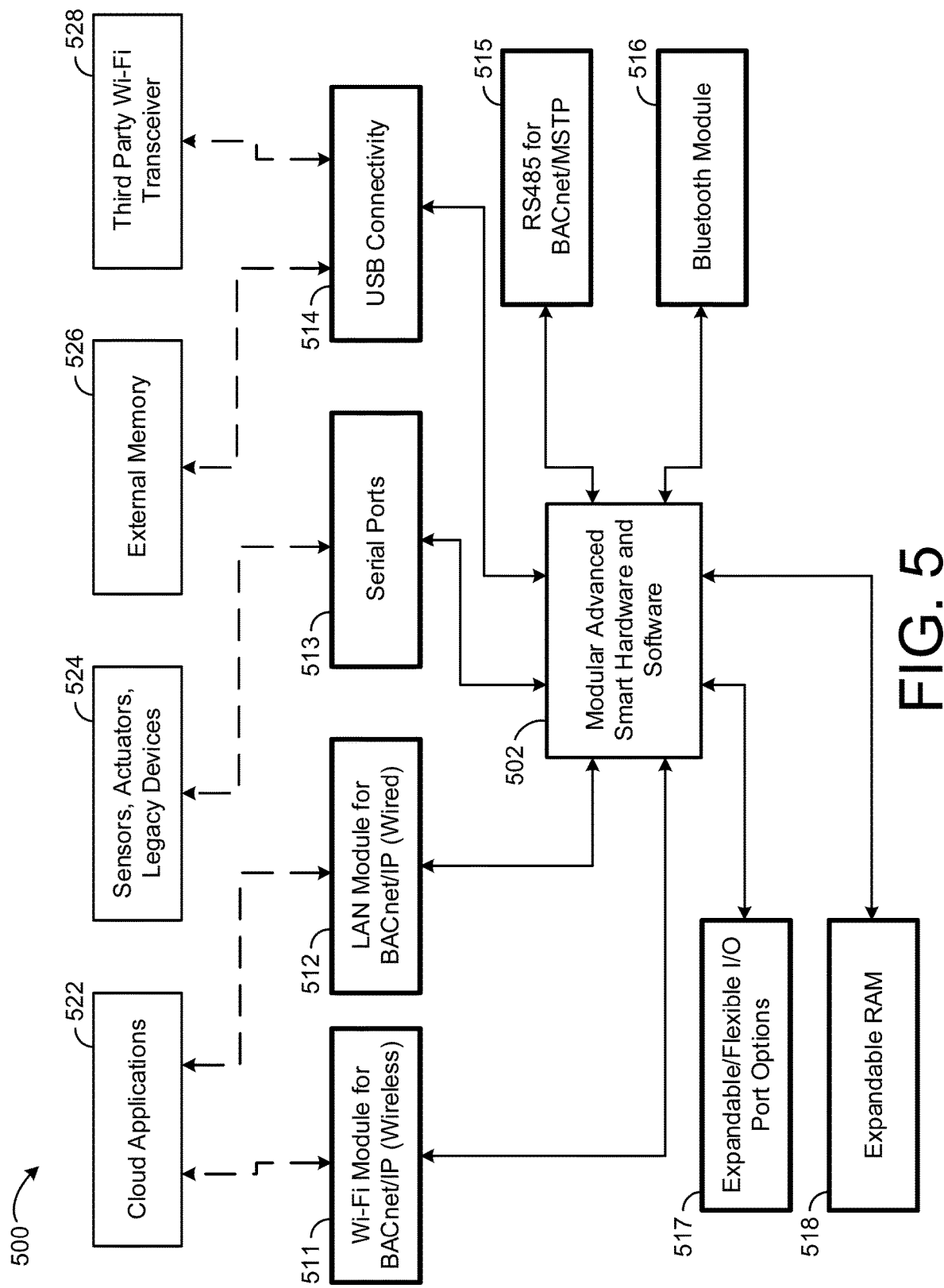
FIG. 5 is a block diagram of an example modular smart hardware and software system architecture associated with the BMS of FIG. 4 is shown, according to some embodiments.

Referring now to FIG. 5, a block diagram showing an example modular smart hardware and software system architecture 500 for control and monitoring of edge devices in a BMS is shown, according to some embodiments. In some previous architectures, edge devices such as sensors and actuators may need to rely upon "higher" devices such as controllers and network engines to perform various functions. For example, sensors and actuators may lack the hardware and/or software necessary to aggregate sensor data and execute complex control logic. In order to provide building equipment like sensors and actuators with more advanced functionality, customers may be required to purchase expensive hardware and/or software, thereby leading to unnecessary cost. Modular architecture 500 may be implemented within BMS 400 to provide customers with the option to pay only for the hardware and/or software needed for a given application while still providing advanced functionality for edge devices.

As shown in FIG. 5, at the center of modular architecture 500 is a smart device 502. Device 502 generally provides a standard chipset for control and monitoring of edge devices in BMS 400. For example, a standard offering of device 502 may include serial ports 513 for interfacing with edge devices and a BACnet interface for integrating edge devices into a larger system such as BMS 400. However, expandable options may also be provided with device 502 to provide communication with various other devices, systems, and networks. Device 502 can be a microcontroller unit (MCU), a system on a chip (SOC), or generally any type of circuit such as an integrated circuit (IC), an application-specific integrated circuit (ASIC), a daughterboard, or a field-programmable gate array (FPGA) to name some examples. Device 502 may also be a larger device or may be a circuit or chip installed in or connected to a larger device. Further, device 502 may connect to existing devices such as a central processing unit (CPU) of a sensor or actuator or may replace processing circuits of existing devices.

FIG. 5 is shown to include a variety of different modular hardware components that may be provided with device 502. These modular hardware components include a wireless communications module 511, a wired communications module 512, a universal serial bus (USB) module 514, an RS-485 interface 515, a Bluetooth module 516, expandable input/output (I/O) points 517, and an expandable memory 518 (e.g., SD-RAM). Other types of modular hardware components are possible and contemplated. Generally, modular architecture 500 allows device 502 to be customized for a variety of different applications. By means of fixed and/or modular hardware components, device 502 can communicate with edge and legacy devices 524, cloud applications 522, external memory 526, and a Wi-Fi transceiver 528 to name some examples.

Figure 6:
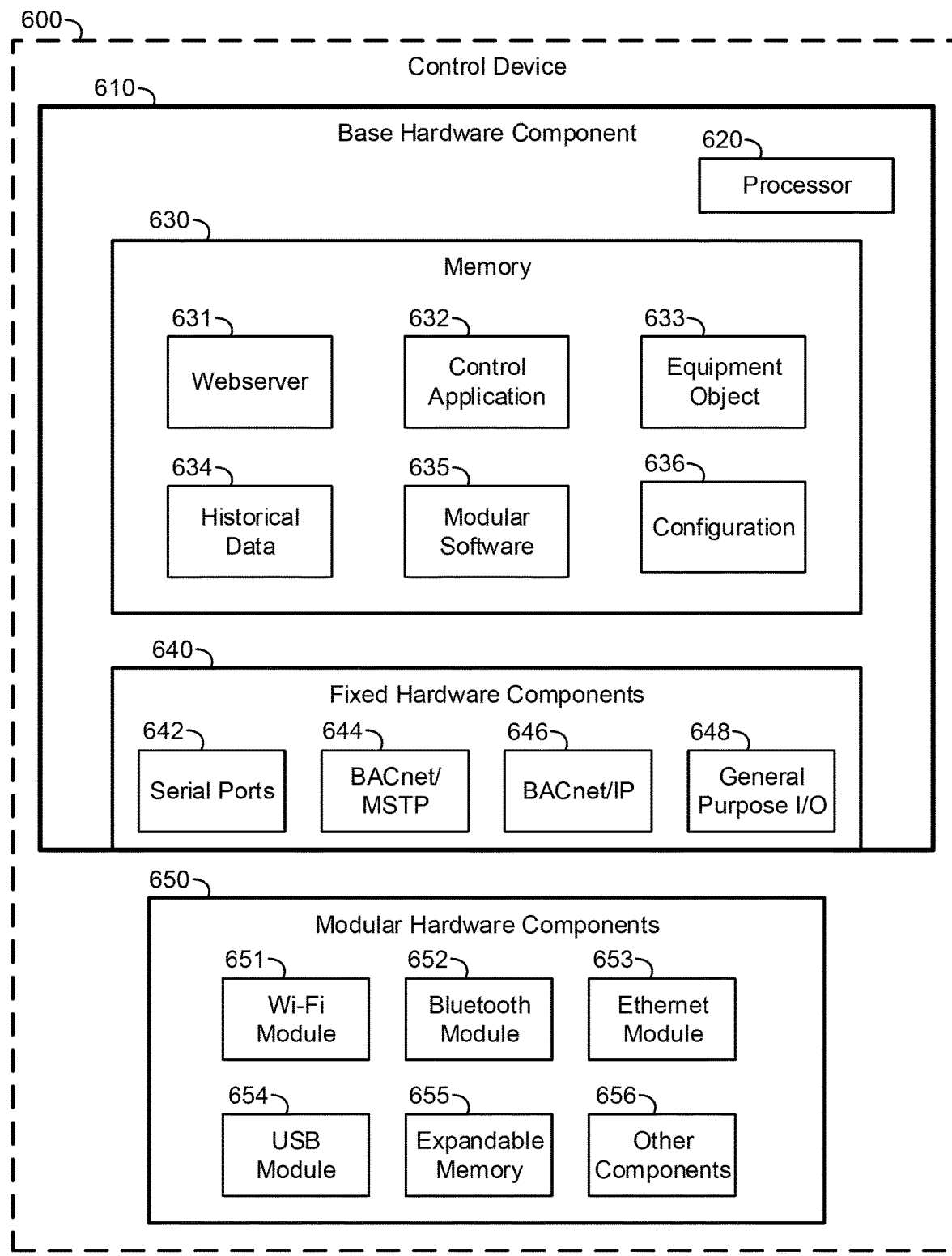
FIG. 6 is a block diagram of an example control device associated with the architecture shown in FIG. 5, according to some embodiments.

Referring now to FIG. 6, a block diagram showing an example smart control device 600 in detail is shown, according to some embodiments. Control device 600 may be the same as or similar to device 502 as described above. As shown in FIG. 6, control device 600 includes a base hardware component 610 with a processor 620, a memory 630, and various fixed hardware components 640. Control device 600 may also include any of a variety of modular hardware components 650 that can be connected to base hardware component 610 if needed for a given application. For example, base hardware component 610 can be designed such that a Wi-Fi module 651 can be connected to base hardware component 610 if a customer desires Wi-Fi communication capabilities. However, if the customer does not need Wi-Fi functionality, then the customer can purchase control device 600 without Wi-Fi module 651, thereby saving cost. Control device 600 may communicate with building equipment such as described herein using fixed hardware components 640, modular hardware components 650, or any combination thereof.

As shown in FIG. 6, fixed hardware components 640 include serial ports 642, a BACnet/MSTP interface 644, a BACnet/IP interface 646, and general purpose input/output (GPIO) points 648. It should be noted that fixed hardware components 640 as shown in FIG. 6 are intended to provide an example. Control device 600 may be provided with different fixed hardware components 640 than shown in FIG. 6. Similarly, modular hardware components 650 are shown to include Wi-Fi module 651 in addition to a Bluetooth module 652, an Ethernet module 653, a USB module 654, an expandable memory 655, and other components 656. It will be appreciated that control device 600 can be provided with more, less, or different expandable options other than shown in FIG. 6.

Serial ports 642 may provide a serial connection between control device 600 and building equipment such as sensors and actuators. For example, an actuator such as actuator 354 described above may have a serial interface through which it can connect to control device 600 through serial ports 642. Serial ports 642 may be designed for use with RS-232 standard, RS-422 standard, RS-485 standard, I$^2$C standard, USB standard, or any other type of serial communications. Serial ports 642 may be male or female connectors with any number of pins. Moreover, it will be appreciated that fixed hardware components 640 may also include parallel ports instead of or in addition to serial ports.

BACnet/MSTP interface 644 may be hardware that provides an interface between control device 600 and a BACnet Master-Slave Token Passing communications bus such as a Sensor Actuator (SA) bus. BACnet/MSTP interface 644 can provide a serial connection to such a bus based on RS-485 standard. BACnet/IP interface 646 may be hardware that provides an interface between control device 600 and a BACnet/IP network. BACnet/IP interface 646 may provide a wired or wireless connection to a BACnet/IP network. In some embodiments, fixed hardware 640 can provide an interface for connecting control device 600 to a BACnet router or other type of router.

General purpose input/output points 648 may be uncommitted signal pins provided with based hardware component 610. These inputs and outputs can be used for a variety of different purposes depending on the application of control device 600. For example, I/O points 648 can receive inputs from sensors such as temperature sensors, flow sensors, pressure sensors, air quality sensors, occupancy sensors, and other types of sensors. I/O points 648 can also receive inputs from and provide output to equipment such as valves and actuators in addition to other BMS devices such as described above. Points 648 can be used to provide outputs such as control signals (e.g., setpoints), commands, requests for data, and the like.

Processor 620 may be any type of processor such as a central processing unit (CPU). It will be appreciated that processor 620 may have one or more processing cores. Memory 630 may be any type and size of memory such as random access memory (RAM), flash memory, read-only memory (ROM), or any combination thereof. Processor 620 and memory 630 generally allow control device 600 to perform more advanced functions than otherwise possible with more minimal hardware that may be provided with edge devices such as sensors and actuators. Memory 630 is shown to include a variety of components including a webserver 631, a control application 632, an equipment object 633, historical data 634, modular software 635, and configuration 636. It will be appreciated that memory 630 may include more, less, and/or different components than shown in FIG. 6.

Webserver 631 can be embedded within memory 630 in order to provide users with access to control device 600 through a web browser using HTTP or HTTPS protocol. For example, users can access control device 600 using a web browser on a client device such as a smartphone, a laptop, a tablet, a personal computer, a workstation, and the like through webserver 631. This functionality allows users to easily view, edit, and manage data associated with control device 600 and associated building equipment. For example, users can view historical data 634 and edit attributes of equipment object 633 through a web browser.

Control application 632 can be downloaded to control device 600 in order to affect operation of building equipment. Control application 632 can process data related to the building equipment in order to determine control decisions for the building equipment. Multiple different control applications can be downloaded to control device 600, and existing control application can be deleted, as opposed to control device 600 coming with a standard control application that cannot be changed. In some embodiments, control application 632 is created using a programming language such as MATLAB and/or other similar programming languages (e.g., C, Python, Java, etc.). For example, users may develop a fan coil control application that determines control signals based on temperature inputs, flow inputs, power consumption inputs, and the like. The ability to download control application 632 directly to control device 600 provides expanded control opportunities for edge devices such as sensors and actuators. In some embodiments, architecture 500 provides a software platform that application programmers can use to develop control application 632.

Equipment object 633 can provide a model of building equipment connected to control device 600. Equipment object 633 can contain one or more attributes related to the building equipment. For example, the attributes may be variable data points or data values such as temperature, pressure, flow, position, speed, on/off, name, identifier, and other attributes. The attributes of equipment object 633 may be customizable by the end user. In some embodiments, some or all of the attributes of equipment object 633 are defined in accordance with a data model to provide smooth interoperability within larger systems.

Historical data 634 may be any type of data related to building equipment that is stored within control device 600. For example, historical data 634 may include sensor data and other data such as temperature data, flow data, pressure data, speed data, equipment status data, energy usage data, runtime data, device identifiers, network identifiers, and the like. Historical data 634 may be used by control application 632 to make informed control decisions for building equipment and may also be viewed by users to gain insight into the operation of building equipment and control device 600. The ability to aggregate and manage data on control device 600 can provide a variety of advantages.

Modular software 635 may be stored in memory 630 such that base hardware component 610 can detect, recognize, and utilize various modular hardware components 650 that are connected to base hardware component 610 without requiring any additional programming. For example, if Wi-Fi module 651 is connected to base hardware component 610, a modular software component stored in memory 630 can recognize Wi-Fi module 651 and provide the necessary software such that control device 600 can both send and receive data through Wi-Fi module 651. Similar modular software components can be provided for other modular hardware components 650 such as Bluetooth module 652 and Ethernet module 653. Some or all components of modular software 635 may be stored in memory 630 at the time of manufacturing of control device 600. Some or all components of modular software 635 may also be downloaded to control device 600 as needed depending on the specific application of control device 600. The combination of modular software 635 and one or more modular hardware components 650 allows control device 600 to easily adapt to a variety of different applications without forcing customers to purchase unnecessary hardware or software.

Configuration 636 may include any settings related to control device 600 that can be configured by the end user. In some embodiments, configuration 636 represents one or more files stored on control device 600 that contain such settings. Configuration 636 may include a device identifier (e.g., MAC address, BACnet identifier, etc.), network settings, a device name, a device owner, and the like. Further, configuration 636 may include settings for interfacing with building equipment such as addressing, polling, and subscribing.

Any of modular hardware components 650 can be provided with base hardware component 610 to provide control device 600 with additional functionality. Modular hardware components 650 can be connected to base hardware component 610 at the time of manufacturing or can be connected to base hardware component 610 after manufacturing. Base hardware component 610 may be contained on a single substrate, and that substrate may be designed such that one or more modular hardware components 650 can be easily connected to base hardware component 610. This architectural design of control device 600 allows customers to select only hardware components desired for a specific application without forcing customers to purchase hardware that is not necessary. Moreover, customers can remove any of modular hardware components 650 from base hardware component 610 if desired. The architectural design of control device 600 also allows customers to easily replace a failed component in the field instead of removing the component for servicing or purchasing an entirely new part. It will be appreciated that various modular hardware components 650 as described below can also be provided as dongles (e.g., attach to a port instead of to a substrate).

Wi-Fi module 651 may be any type of hardware component that provides a connection between control device 600 and a Wi-Fi network. For example, Wi-Fi module 651 can be connected to base hardware component 610 such that control device 600 can connect to a wireless access point (AP). Wi-Fi module 651 may also be hardware that allows control device 600 to host a wireless access point such that Wi-Fi devices including laptop computers, smart phones, sensors, actuators, and other types of client devices may connect to control device 600 through Wi-Fi. In this sense, Wi-Fi module 651 can be used to make control device 600 a client on a Wi-Fi network or an access point on a Wi-Fi network. A modular software component stored in memory 630 may recognize Wi-Fi module 651 when connected to base hardware component 610 and provide functionality such that control device 600 can send and receive data through Wi-Fi module 651. This functionality provided by Wi-Fi module 651 may enable cloud connectivity between control device 600 and one or more remote computing systems. Wi-Fi module 651 may also allow control device 600 to communicate with other devices such as other control devices 600, sensors, actuators, and controllers, either directly or indirectly.

Bluetooth module 652 may be any type of hardware component that provides a connection between control device 600 and a Bluetooth network. For example, users may connect to control device 600 via a user device such as a smartphone or a tablet through a wireless Bluetooth connection enabled by Bluetooth module 652. Control device 600 may also send data related to building equipment via Bluetooth in addition to other possibilities enabled by Bluetooth connection. For example, users may perform various wireless downloads via Bluetooth. A modular software component stored in memory 630 may recognize Bluetooth module 652 when connected to base hardware component 610 and provide functionality such that control device 600 can send and receive data through Bluetooth module 652.

Ethernet module 653 may be any type of hardware component that provides a connection between control device 600 and an Ethernet network such as a local area network (LAN) or a wide area network (WAN). For example, Ethernet module 653 may have a port for connecting an Ethernet cable. A modular software component stored in memory 630 may recognize Ethernet module 653 when connected to base hardware component 610 and provide functionality such that control device 600 can send and receive data through Ethernet module 653. In some embodiments, this data is transferred using Internet Protocol (IP). This functionality provided by Ethernet module 653 may enable cloud connectivity between control device 600 and one or more remote computing systems. Ethernet module 653 may also allow control device 600 to communicate with other devices such as other control devices 600, sensors, actuators, and controllers, either directly or indirectly.

USB module 654 may be any type of hardware component that provides a USB connection between control device 600 and another system, device, and/or network. For example, USB module 654 may have a USB port to provide a connection between control device 600 and an external memory or a Wi-Fi transceiver via a USB cable. USB module 654 may also provide a connection between control device 600 and a user device such as a laptop. A modular software component stored in memory 630 may recognize USB module 654 when connected to base hardware component 610 and provide functionality such that control device 600 can send and receive data through USB module 654.

Expandable memory 655 may be any type of hardware component that provides expanded memory beyond the capacity of memory 630 of base hardware component 610. Depending on the specific application, additional memory may be needed to store data and/or execute more complex control applications in addition to other purposes. For example, expandable memory 655 may include expandable RAM. A modular software component stored in memory 630 may recognize expandable memory 655 when connected to base hardware component 610 and provide functionality such that control device 600 can read data from and write data to expandable memory 655.

The other components 656 may include a variety of other types of modular hardware components other than described above. For example, these other components may provide a connection between control device 600 and a Modbus network, a LonTalk network, a KNX network, a Z-Wave network, a ZigBee network, and other similar networks. The other components may also include a power over Ethernet (PoE) powered device (PD) or power sourcing equipment (PSE) module, a cellular module and a near field communications (NFC) module. The other components may generally include a variety of different wireless communications modules and wired communication modules in addition to analog-to-digital converters (ADC) and digital-to-analog converters (DAC). The other components may also include various different types of ports in addition to expandable or flexible I/O points and increased processing power. It will be appreciated that a variety of different modular components 650 can be provided consistent with the modular architecture described herein.

Figure 7:
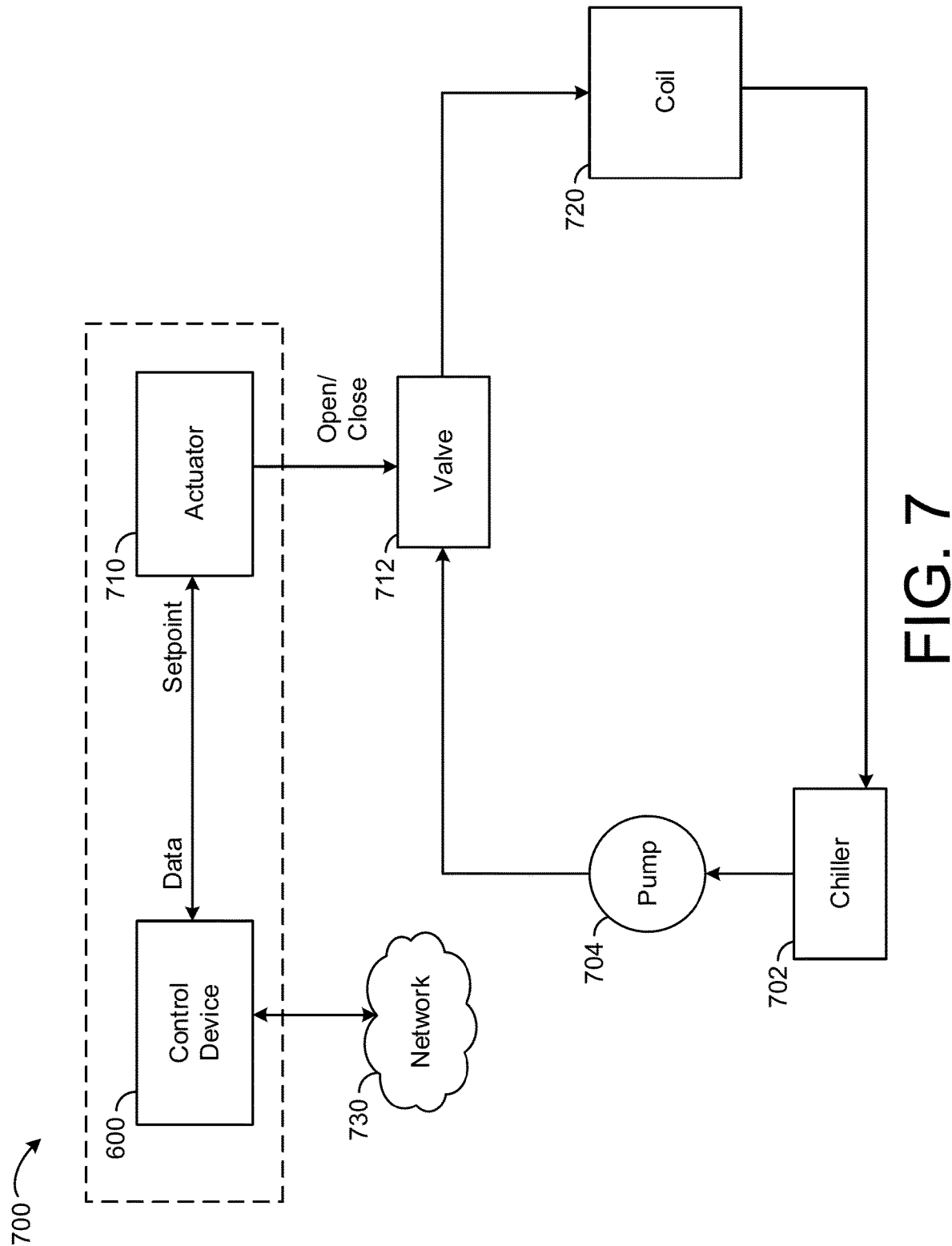
FIG. 7 is a block diagram of an example control system in which the control device of FIG. 6 can be implemented, according to some embodiments.

Referring now to FIG. 7, a block diagram showing an example system 700 in which control device 600 can be implemented is shown, according to some embodiments. System 700 can generally be described as a system for controlling flow of chilled fluid through a cooling coil 720. The chilled fluid is generated by a chiller 702 and is forced to flow through piping by a pump 704. Before passing through coil 720, the fluid passes through a valve 712 that can be moved between an open position and a closed position by an actuator 710. Chiller 702, pump 704, actuator 710, valve 712, and coil 720 may be similar to chiller 102, pumps 234, actuator 354, valve 346, and coil 344 as described above, for example.

Actuator 710 may lack the hardware and/or software necessary to communicate directly with a BMS network 730 (e.g., a BACnet network) and other networks. However, control device 600 can be used to turn actuator 710 into a "smart" actuator that can communicate with these networks directly. Control device 600 may connect to actuator 710 through a serial interface (e.g., using serial ports 642) or another type of interface. Control device 600 may also replace an existing processing circuit of actuator 710 or be installed in actuator 710 at the time of manufacturing. The capabilities provided by control device 600 can remove the dependency of actuator 710 on higher devices such as network engines and more expensive controllers (e.g., AHU controller 330). It will be appreciated that control device 600 can be implemented in a variety of different building systems to provide control and monitoring to edge devices. For example, control device 600 can be implemented with HVAC-related sensors and other types of building sensors. The architectural design of control device 600 may provide improved efficiency for development and prototyping of various technology for building applications.

Figure 8:
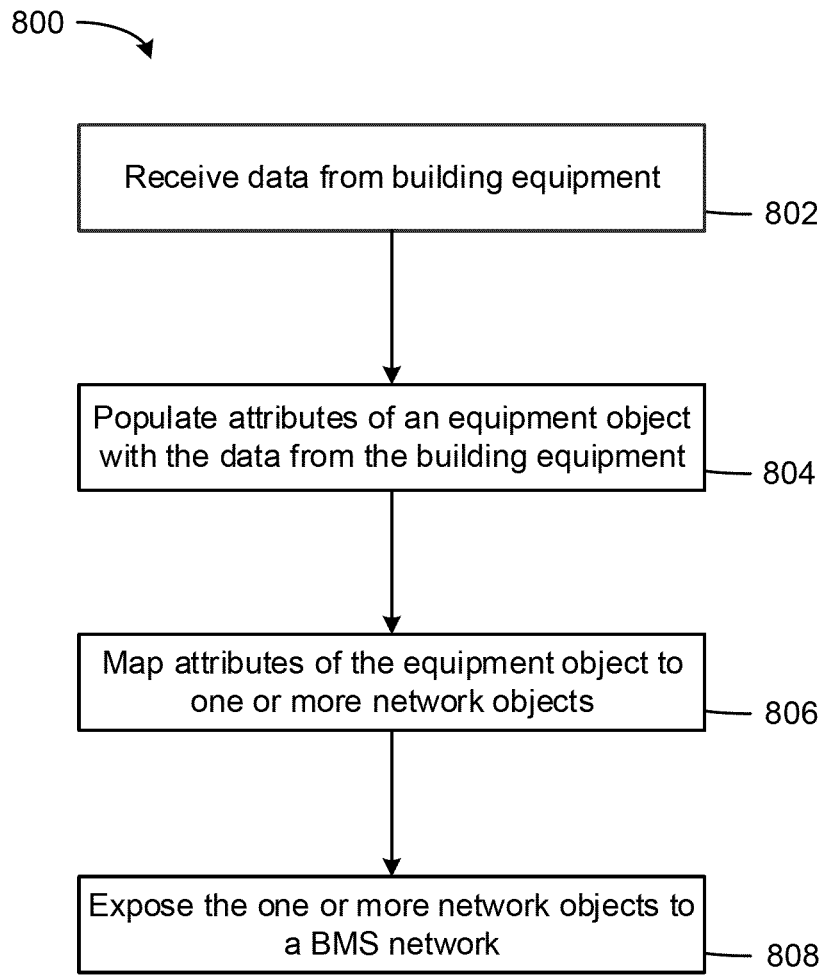
FIG. 8 is a flow diagram of a process for integrating building equipment into a BMS network using the control device of FIG. 6, according to some embodiments.

Referring now to FIG. 8, a process 800 for integrating building equipment into a BMS network is shown, according to some embodiments. In some embodiments, process 800 is performed by control device 600 as described above. Process 800 allows building owners, managers, and other personnel to convert edge devices such as sensors and actuators into "smart" devices in an efficient, low-cost, and flexible manner.

Process 800 is shown to include receiving data from building equipment (step 802). The data may be any type of data received from equipment such as edge devices in a BMS. For example, the data may be sensor readings such as temperature data, flow data, position data, pressure data, speed data, power consumption data, air quality data, occupancy data, humidity data, status data, and the like. The building equipment may include edge devices such as actuators, sensors, thermostats, alarms, and other types of systems and devices. The data may be received through fixed hardware components 640 such as serial ports 642 and/or GPIO points 648. The data may also be received through a variety of modular hardware components 650.

Process 800 is also shown to include populating attributes of an equipment object with the data received from the building equipment (step 804). For example, the equipment object may be equipment object 633 as described above. Control device 600 may provide the end user with the ability to customize one or more attributes of the equipment object such that data of interest from the building equipment is contained in the equipment object. For example, if the building equipment is an actuator that controls a valve, the equipment object may include attributes such as a setpoint (e.g., a flow setpoint), a valve position, a minimum stroke length, and a status. The equipment object generally provides a model of the building equipment that can be used by control device 600 to provide an interface between the building equipment and a BMS network.

Process 800 is also shown to include mapping the attributes of the equipment object to one or more network objects (step 806). For example, attributes of the equipment object may be mapped to one or more standard BACnet objects. The standard BACnet objects may include analog input objects, binary input objects, analog output objects, device objects, file objects, and schedule objects among other types of objects. Each of these network objects may also contain one or more properties or attributes. The network objects may also be associated with a different type of network besides a BACnet network. For example, the network objects may be Modbus objects such as an input register or a holding register. It will be appreciated that step 806 generally involves mapping between the equipment object and a protocol associated with an external network such as a BMS network, whether the external network is object-oriented in a manner similar to a BACnet network or not.

Process 800 is also shown to include exposing the one or more network objects to a BMS network (step 808). For example, after mapping the attributes of the equipment object to the one or more standard BACnet objects, control device 600 may write the attributes of the equipment object to the one or more standard BACnet objects and expose the one or more standard network objects to a BACnet network. The one or more standard BACnet object may be exposed to the BACnet network using fixed hardware components 640 such as BACnet/MSTP interface 644 and BACnet/IP interface 646 or using modular hardware components 650 such as Wi-Fi module 651 and Ethernet module 653. Step 808 may also involve exposing data from the building equipment to networks other than a BACnet network.

After the connection between the building equipment and the BMS network is established using process 800, the building equipment can then be monitored through the BMS as well as controlled through the BMS. For example, users can change a setpoint associated with the building equipment through the BMS, and this command can be received at control device 600. Control device 600 may then write this new setpoint to the appropriate attribute of the equipment object in accordance with the mapping from step 806 and provide the new setpoint to the building equipment.

Figure 9:
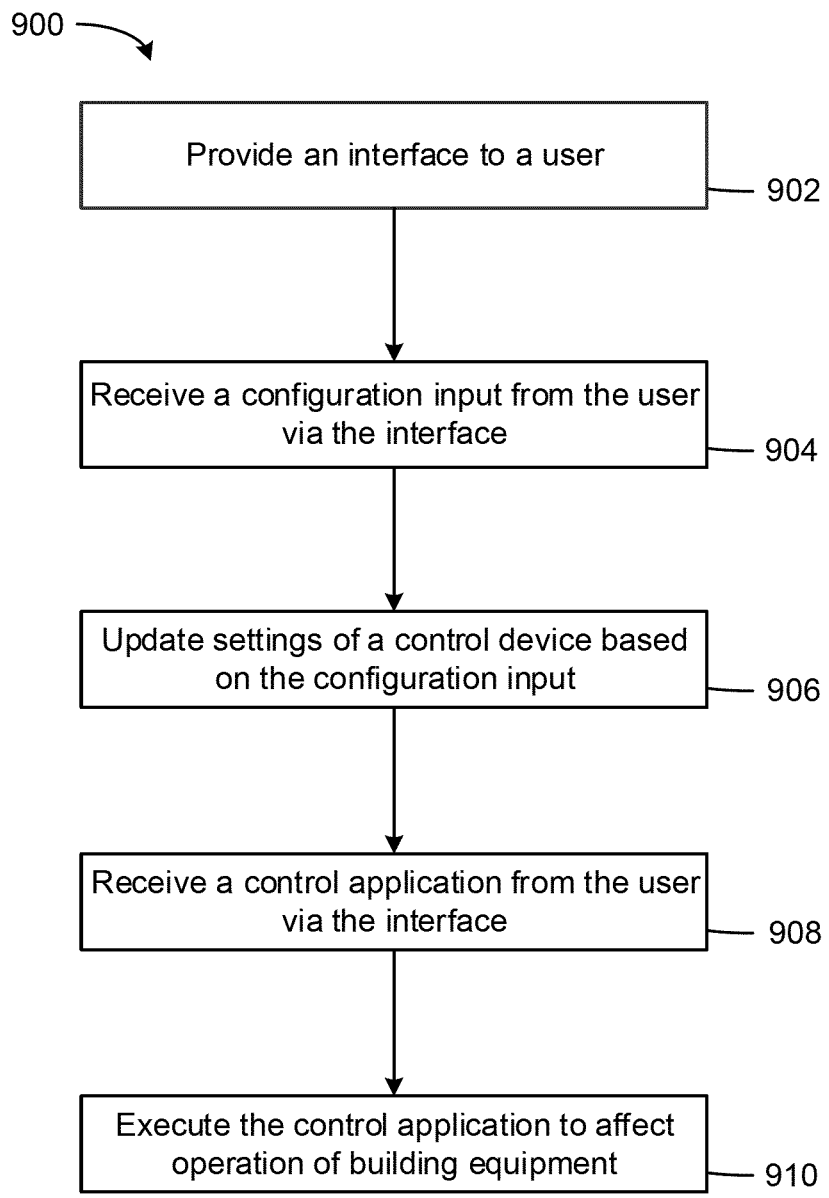
FIG. 9 is a flow diagram of a process for controlling building equipment using the control device of FIG. 6, according to some embodiments.

Referring now to FIG. 9, a process 900 for controlling building equipment is shown, according to some embodiments. In some embodiments, process 900 is performed by control device 600 as described above. Process 900 can be used to provide control and monitoring of edge devices and other building equipment within a BMS such as BMS 400. System architecture 500 as described above may provide a platform for developers to build control applications for controlling building equipment. In some previous approaches, engineers may be required to develop technology for a variety of different hardware environments. For example, to deploy a fan coil application, extensive time and money may be required to ensure that the fan coil application can be deployed to a variety of different types and models of actuators and controllers. In contrast, the architectural design of control device 600 may provide a common platform for development and prototyping of various building technologies. As a result, significant savings in both time and money may be achieved.

Process 900 is shown to include providing an interface to a user (step 902). For example, the interface may be a web interface facilitated by webserver 631 that can be accessed using a web browser. The interface may also be generated by an application running on a user device such as a smartphone, tablet, laptop, etc. The interface may also be generated by a remote computing system such as a cloud system through which data associated with control device 600 can be accessed. It will be appreciated that architecture 500 allows users to interact with control device 600 in a variety of different ways.

Process 900 is also shown to include receiving a configuration input from the user via the interface (step 904). A variety of different configuration inputs are possible, however the configuration input generally relates to settings of control device 600. For example, the configuration input may instruct control device 600 to obtain updated data values from building equipment at periodic intervals (e.g., every 15 minutes). Process 900 is also shown to include updating the settings of a control device based on the configuration input (step 906). For example, configuration 636 of control device 600 may be updated.

Process 900 is also shown to include receiving a control application from the user via the interface (step 908). For example, the control application may be control application 632 as described above. Users may develop control applications using a programming language such as MATLAB and download the control applications to control device 600 in order provide advanced control functionality to building equipment. The capability to develop and download control applications directly to control device 600 in this manner creates many different opportunities for control and monitoring of building equipment.

Process 900 is also shown to include executing the control application to affect operation of building equipment (step 910). For example, control device 600 may execute control application 632 in order to determine a setpoint and provide the setpoint to the building equipment. Control device 600 may also execute control application 632 in order to determine a valve position, and then an actuator may move a valve to that position, for example.

Figure 10:
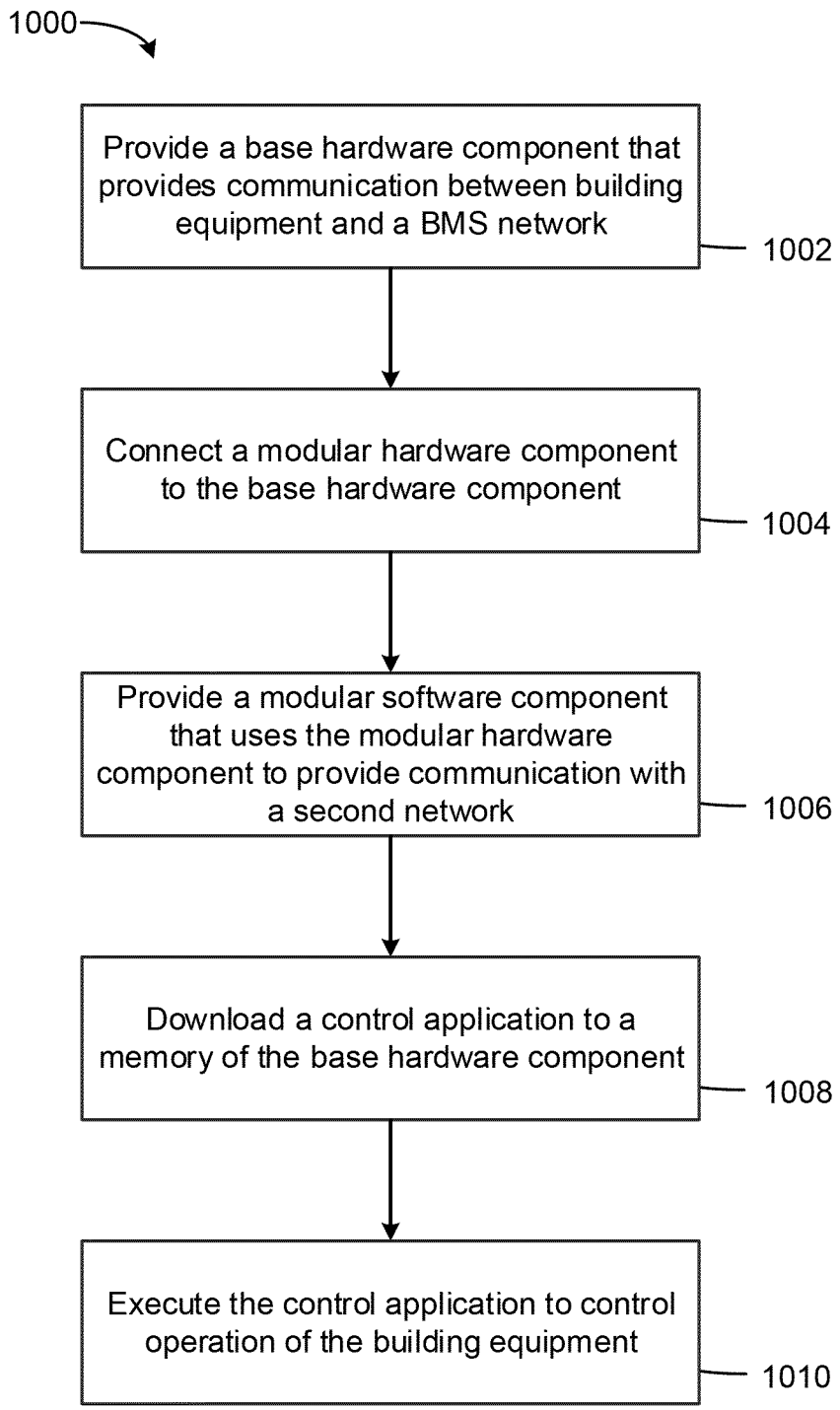
FIG. 10 is a flow diagram of another process for controlling building equipment using the control device of FIG. 6, according to some embodiments.

Referring now to FIG. 10, another process 1000 for controlling building equipment is shown, according to some embodiments. Process 1000 allows building owners, managers, and other personnel to convert edge devices such as sensors and actuators into "smart" devices in an efficient, low-cost, and flexible manner. Process 1000 also provides customers with the ability to create custom control applications and download these control applications directly to control device 600.

Process 1000 is shown to include providing a base hardware component that provides communication between building equipment and a BMS network (step 1002). For example, the base hardware component may be base hardware component 610 as described above. The base hardware component may connect to the building equipment through fixed hardware components 640 such as serial ports 642 and GPIO points 648. The base hardware component may also replace existing processing circuits in building equipment (e.g., actuator CPU) or be installed in building equipment at the time of manufacturing. The base hardware component may provide a connection between the building equipment and a BACnet network, for example.

Process 1000 is also shown to include connecting a modular hardware component to the base hardware component (step 1004). For example, the modular hardware component may be any of modular hardware components 650 as described above. The ability to connect the modular hardware component to the base component in this manner allows customers to expand the functionality of control device 600 at a minimal, incremental cost.

Process 1000 is also shown to include providing a modular software component that uses the modular hardware component to provide communication with a second network (step 1006). For example, the modular software component can be part of modular software 635 as described above. The second network may be a Wi-Fi network, a Bluetooth network, an Ethernet network, or another type of network. The second network may be associated with the first network or may not be associated with the first network. For example, the first network may be a BACnet/MSTP network and the second network may be a BACnet/IP network. As another example, the first network may be an Ethernet network, and the second network may be a Wi-Fi network. In this example, control device 600 may connect to a network device associated with a BMS (e.g., an on-premises server, a gateway, a network engine, etc.) through an Ethernet connection provided by either fixed hardware components 640 or modular hardware components 650. Additionally, control device 600 may host an access point using either fixed hardware components 640 or modular hardware components 650 to provide Wi-Fi client connectivity to one or more wireless sensors.

Process 1000 is also shown to include downloading a control application to a memory of the base hardware component (step 1008). For example, the control application may be control application 632 as described above. Process 1000 is also shown to include executing the control application to control operation of the building equipment (step 1010). The control application may generate control signals for the building equipment based on data received from at least one of the first network and the second network. For example, control device 600 may receive data from a BMS network such as data related to separate but related building equipment such as chiller 702. This data can be used by the control application to determine control signals for actuator 710. Additionally, control device 600 may receive a temperature setpoint form a user such as through a web browser or other type of application.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A device for monitoring or controlling equipment in a building system, the device comprising:
   a base hardware component that provides communication between the equipment and a first network associated with the building system, the base hardware component comprising a processor and a memory;
   a connector for a first modular hardware component installable on and removable from the base hardware component; and
   a first modular software component stored in the memory that recognizes the first modular hardware component when installed on the base hardware component and provides communication between the equipment and a second network using the first modular hardware component.

2. The device of claim 1, further comprising:
   a second modular software component stored in the memory that recognizes a second modular hardware component when installed on the base hardware component and provides communication between the equipment and a third network using the second modular hardware component, wherein the processor executes a control application to control operation of the equipment based in part on data received from the equipment and data received from at least one of the first network or the second network wherein the base hardware component comprises a microcontroller unit (MCU) or a system on a chip (SOC).

3. The device of claim 1, wherein the first modular hardware component comprises a wireless communications module, a wired communications module, a universal serial bus (USB) module, a dongle-based module, a plurality of input/output (I/O) ports, or an expandable memory.

4. The device of claim 1, wherein the first network comprises a BACnet network.

5. The device of claim 1, wherein the second network comprises at least one of a cellular network, Bluetooth network, a Modbus network, a LonTalk network, a KNX network, a Z-Wave network, or a ZigBee network.

6. The device of claim 1, wherein the first network is an ethernet and the second network is a WIFI network.

7. The device of claim 1, further comprising an embedded webserver.

8. The device of claim 2, wherein the control application can be changed.

9. The device of claim 1, wherein the equipment comprises a sensor or an actuator.

10. A building system the system comprising:
   equipment that affects or senses an environment within a building;
   a device for monitoring and controlling the equipment, the device comprising:
      a base hardware component that provides communication between the equipment and a first network associated with the building system, the base hardware component comprising a processor and a memory;
      a first modular hardware component connectable to and removable from the base hardware component; and
      a first modular software component stored in the memory that recognizes the first modular hardware component when installed on the base hardware component and provides communication between the equipment and a second network using the first modular hardware component;
      a second modular hardware component installable on and removable from the base hardware component; and
      a second modular software component stored in the memory that recognizes the second modular hardware component when installed on the base hardware component and provides communication between the equipment and a third network using the second modular hardware component,
      wherein the processor of the device executes a control application to control operation of the equipment and the environment within the building based in part on data received from the equipment and one or more commands received from at least one of the first network or the second network.

11. The system of claim 10, wherein the base hardware component comprises a microcontroller unit (MCU) or a system on a chip (SOC).

12. The system of claim 10, wherein the first modular hardware component comprises a wireless communications module, a wired communications module, a universal serial bus (USB) module, a plurality of input/output (I/O) ports, or an expandable memory.

13. The system of claim 10, wherein the device further comprises an embedded webserver.

14. The system of claim 10, wherein the control application can be changed.

15. A method for monitoring or controlling a device in a building management system (BMS), the method comprising:
   communicating between the device and a first network associated with the BMS using a base hardware component comprising a processor and a memory;
   recognizing that a first modular hardware component is installed on the base hardware component using first modular software component stored in the memory that recognizes the first modular hardware component when installed on the base hardware component; and
   providing communication between the device and a second network using the first modular hardware component.

16. The method of claim 15, further comprising:
   recognizing a second modular hardware component is installed on the base hardware component using a second modular software component stored in the memory that recognizes the second modular hardware component when installed on the base hardware component; and
   downloading a control application to the memory; and
   executing the control application to control operation of the device based in part on data received from the device and data received from at least one of the first network or the second network.

17. The method of claim 15, further comprising:
   providing an embedded webserver within the memory of the base hardware component.

18. The method of claim 15, wherein the device comprises an actuator, the method further comprising:
   collecting data from the actuator that characterizes operation of the actuator;
   storing the data from the actuator in the memory of the base hardware component; and
   executing a control application using the data from the actuator.

19. The method of claim 18, wherein the control application comprises a first control application, the method further comprising:
   removing the first control application from the memory; and
   downloading a second control application to the memory using the second network.

20. The method of claim 15, wherein the base hardware component comprises a microcontroller unit (MCU) or a system on a chip (SOC).

* * * * *